US010414988B2

(12) United States Patent
Bailey et al.

(10) Patent No.: US 10,414,988 B2
(45) Date of Patent: Sep. 17, 2019

(54) METHODS OF TREATING A STREAM COMPRISING CRUDE OIL AND WATER

(71) Applicant: Ecolab USA Inc., St. Paul, MN (US)

(72) Inventors: Joseph P. Bailey, Bogotá (CO); John Ibagon, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/367,409

(22) Filed: Dec. 2, 2016

(65) Prior Publication Data
US 2017/0158968 A1 Jun. 8, 2017

Related U.S. Application Data

(60) Provisional application No. 62/262,131, filed on Dec. 2, 2015.

(51) Int. Cl.
*C10G 33/04* (2006.01)
*B01D 17/04* (2006.01)
*C08L 33/02* (2006.01)
*C08L 61/06* (2006.01)
*C08L 63/00* (2006.01)

(52) U.S. Cl.
CPC ........... *C10G 33/04* (2013.01); *B01D 17/047* (2013.01); *C08L 33/02* (2013.01); *C08L 61/06* (2013.01); *C08L 63/00* (2013.01)

(58) Field of Classification Search
CPC .................................................. C10G 33/04
See application file for complete search history.

(56) References Cited

U.S. PATENT DOCUMENTS

| | | | |
|---|---|---|---|
| 2,792,352 A | 5/1957 | De Groote et al. | |
| 3,684,735 A | 8/1972 | Oppenlaender et al. | |
| 4,031,118 A | 6/1977 | Miller | |
| 4,129,508 A | 12/1978 | Friihauf | |
| 4,416,796 A | 11/1983 | Böhm et al. | |
| 4,551,239 A * | 11/1985 | Merchant | C10G 33/04 208/187 |
| 4,737,265 A * | 4/1988 | Merchant, Jr. | C10G 33/04 166/267 |
| 4,968,449 A * | 11/1990 | Stephenson | B01D 17/047 516/189 |
| 5,693,257 A * | 12/1997 | Hart | B01D 17/047 208/188 |
| 5,759,409 A | 6/1998 | Knauf et al. | |
| 5,921,912 A | 7/1999 | Hart et al. | |
| 6,120,678 A * | 9/2000 | Stephenson | B01D 17/047 208/188 |
| 6,294,093 B1 | 9/2001 | Selvarajan et al. | |
| 7,431,845 B2 | 10/2008 | Manek et al. | |
| 7,550,060 B2 | 6/2009 | Jacobson et al. | |
| 7,563,291 B2 | 7/2009 | Siggelkow et al. | |
| 7,785,442 B2 | 8/2010 | Jacobson et al. | |
| 7,938,934 B2 | 5/2011 | Todorovic et al. | |
| 7,981,251 B2 | 7/2011 | Jacobson et al. | |
| 8,618,180 B2 | 12/2013 | Bruchmann et al. | |
| 9,096,805 B2 | 8/2015 | Williams | |
| 9,303,215 B2 | 4/2016 | Bruchmann et al. | |
| 2008/0153931 A1 | 6/2008 | Bruchmann et al. | |
| 2013/0233796 A1 | 9/2013 | Rao et al. | |
| 2013/0261227 A1 | 10/2013 | Nguyen | |
| 2014/0054232 A1 | 2/2014 | Duttlinger, Jr. et al. | |
| 2014/0228456 A1 | 8/2014 | Bevinakatti et al. | |
| 2015/0307788 A1 | 10/2015 | McDaniel et al. | |
| 2016/0160144 A1 | 6/2016 | Boehnke et al. | |

FOREIGN PATENT DOCUMENTS

| | | |
|---|---|---|
| GB | 2118937 A | 11/1983 |
| GB | 2365020 A | 2/2002 |
| WO | WO 93/14178 A1 | 7/1993 |
| WO | WO 00/13762 A1 | 3/2000 |
| WO | WO 2013/134180 A1 | 9/2013 |
| WO | WO 2013/174631 A1 | 11/2013 |
| WO | WO 2014/031710 A1 | 2/2014 |
| WO | WO 2014/146928 A1 | 9/2014 |
| WO | WO 2017/096129 A1 | 6/2017 |

OTHER PUBLICATIONS

European Patent Office, International Search Report in International Patent Application No. PCT/US2016/064561, dated Mar. 20, 2017, 4 pp.
European Patent Office, Written Opinion in International Patent Application No. PCT/US2016/064561, dated Mar. 20, 2017, 7 pp.
Al-Sabagh et al., "Resolution of water in crude oil emulsion by some novel aromatic amine polyesters," *Egyptian Journal of Petroleum*, vol. 24, pp. 363-374 (2015).
The International Bureau of WIPO, International Preliminary Report on Patentability in International Patent Application No. PCT/US2016/064561, dated Jun. 5, 2018, 8 pp.

* cited by examiner

*Primary Examiner* — Renee Robinson
(74) *Attorney, Agent, or Firm* — Leydig, Voit & Mayer, Ltd.

(57) ABSTRACT

Multi-component performance liquids suitable for treating a stream comprising crude oil and water, and methods of their use, are provided. The multi-component performance liquids comprise solvent and active ingredients, which may have a weight average molecular weight of from about 1200 daltons to about 300,000 daltons. The methods comprise activating a multi-component performance liquid, delivering the activated multi-component performance liquid to a stream comprising crude oil and water, and allowing the treated stream to separate into an oil phase and an aqueous phase.

19 Claims, 2 Drawing Sheets

METHODS OF TREATING A STREAM COMPRISING CRUDE OIL AND WATER

This application claims the benefit of U.S. Provisional Patent Application Ser. No. 62/262,131, filed Dec. 2, 2015, the disclosure of which is incorporated herein by reference in its entirety.

TECHNICAL FIELD

The present disclosure relates to dehydrating crude oil. More particularly, the present disclosure relates to treating a stream comprising crude oil and water to improve dehydration of crude oil.

BACKGROUND

Generally, when crude oil is extracted from the ground, it is commingled (e.g., co-produced) with water and natural gas. The crude oil is generally degassed and dehydrated in the oil field prior to being piped or otherwise transferred to a refinery. Preferably, water is separated from the oil via one or more separation vessels, which may include, for example, a settling tank, a free water knock-out, a heater treater, an electrostatic treater, multiples thereof, and combinations thereof, and is eventually delivered to a sales tank, which may further separate water from the oil. Separation is generally aided by, e.g., emulsion breakers, also known as demulsifiers, which assist in removing water from the oil phase. Ideally, the water that is separated and recovered from the dehydration is reasonably free of oil, and further all the oil is removed, recovered, and sold or refined.

SUMMARY

A method of treating a stream comprising crude oil and water flowing in a conduit is provided. The method comprises activating a multi-component performance liquid comprising from about 55 weight percent to about 90 weight percent active ingredients having a weight average molecular weight of from about 1200 daltons to about 300,000 daltons to form an activated multi-component performance liquid. The activated multi-component performance liquid is delivered to the stream to form a treated stream. The treated stream is allowed to separate into an oil phase and an aqueous phase.

A multi-component performance liquid suitable for activation and use in treating a stream comprising crude oil and water flowing in a conduit is provided. The multi-component performance liquid comprises from about 10 weight percent to about 45 weight percent solvent and from about 55 weight percent to about 90 weight percent active ingredients having a weight average molecular weight of from about 1200 daltons to about 300,000 daltons. The active ingredients comprise at least two of an oxyalkylated alkylphenol formaldehyde resin, a polyol, a block copolymer of polypropylene glycol, an oxyalkylated amine, an oxyalkylated polyol, an oxyalkylated polyethylene imine, polyurethane, combinations thereof, and crosslinked variants thereof.

DETAILED DESCRIPTION

A method of treating a stream comprising crude oil and water flowing in a conduit is provided. The method comprises activating a multi-component performance liquid comprising from about 55 weight percent to about 90 weight percent active ingredients having a weight average molecular weight of from about 1200 daltons to about 300,000 daltons to form an activated multi-component performance liquid. The activated multi-component performance liquid is delivered to the stream, for example, in the form of a loose emulsion of organic product in water (i.e., a loose oil-in-water emulsion), to form a treated stream. The treated stream is allowed to separate into an oil phase and an aqueous phase. For example, a "loose emulsion" is an emulsion that separates in a few (e.g., about 5, or about 4, or about 3, or about 2) minutes once energy input (e.g., mixing) ceases. The resulting separated water is sometimes called free water.

The multi-component performance liquids and methods described herein have provided surprising results related to the treatment, separation and removal of water from a stream comprising crude oil and water, for example, such a stream produced from a crude oil production process. The methods described herein are particularly useful in delivering multi-component performance liquids that comprise emulsion breakers, which are further described herein.

Figure 1:
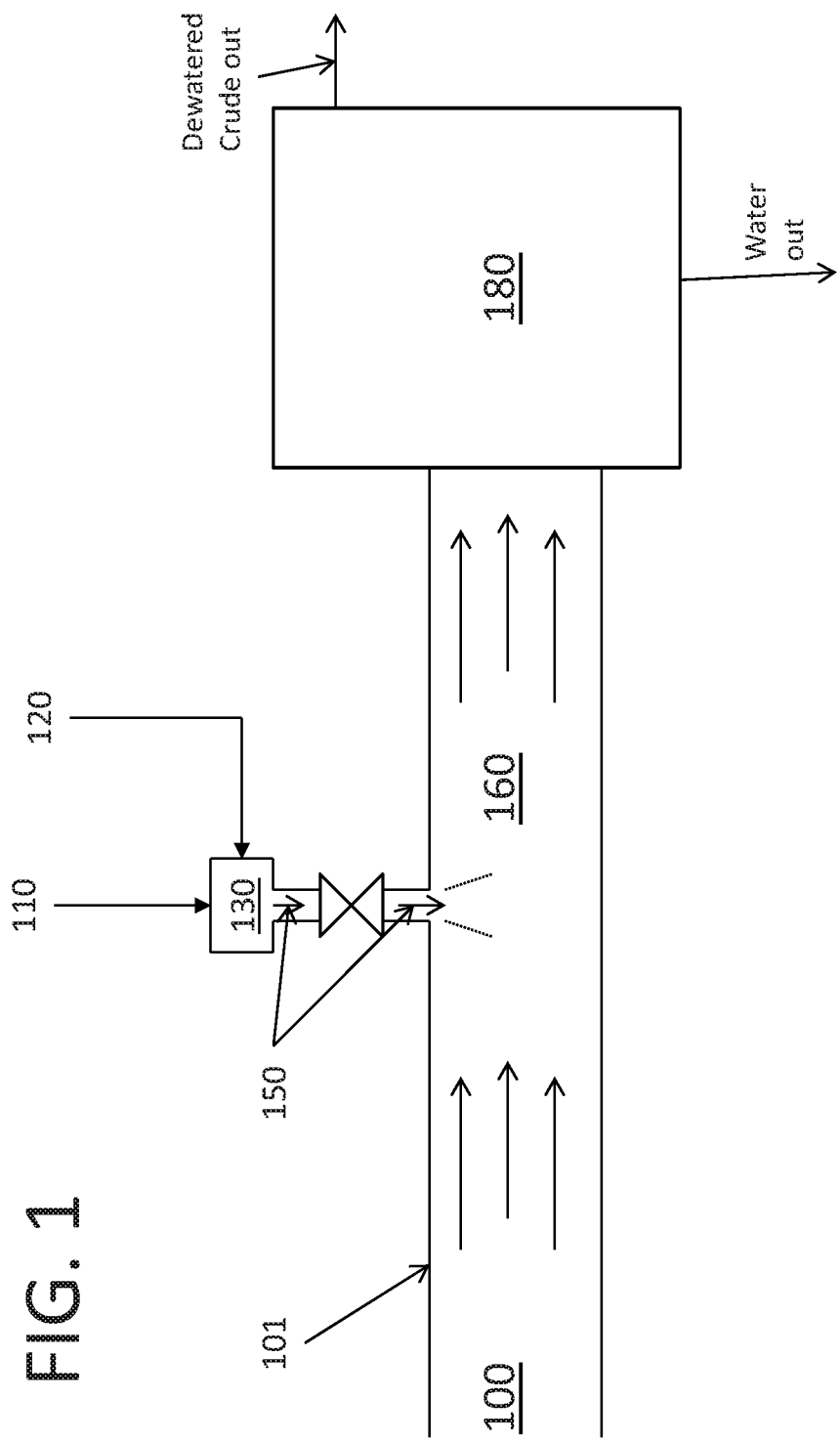
FIG. 1 is a schematic view of an embodiment of a system for performing the methods provided herein.

FIG. 1 shows an embodiment of a system for treating a stream comprising crude oil and water flowing in a conduit. As shown, stream 100 comprising crude oil and water flows in conduit 101. Multi-component performance liquid 110 is activated, e.g., by combining streams of multi-component performance liquid 110 and an aqueous liquid 120 into activator 130 to create activated multi-component performance liquid 150, which in certain embodiments of the methods is a loose oil-in-water emulsion, which is delivered to stream 100 to form treated stream 160. In certain embodiments, activated multi-component performance liquid 150 is delivered to stream 100 in a conical spread pattern. Treated stream 160 is allowed to separate into an oil phase and an aqueous phase, e.g., via vessel 180, which may be a settling tank, a free water knock out, a heater treater, an electrostatic treater, multiples thereof, and/or combinations thereof.

Generally, vessel 180 is operated at a temperature of from about ambient temperature to about 130° C. In certain embodiments, vessel 180 is operated at a temperature of from about 25° C. to about 130° C., including from about 25° C., or from about 50° C., or from about 80° C., to about 130° C., or to about 120° C., or to about 110° C.

Figure 2:
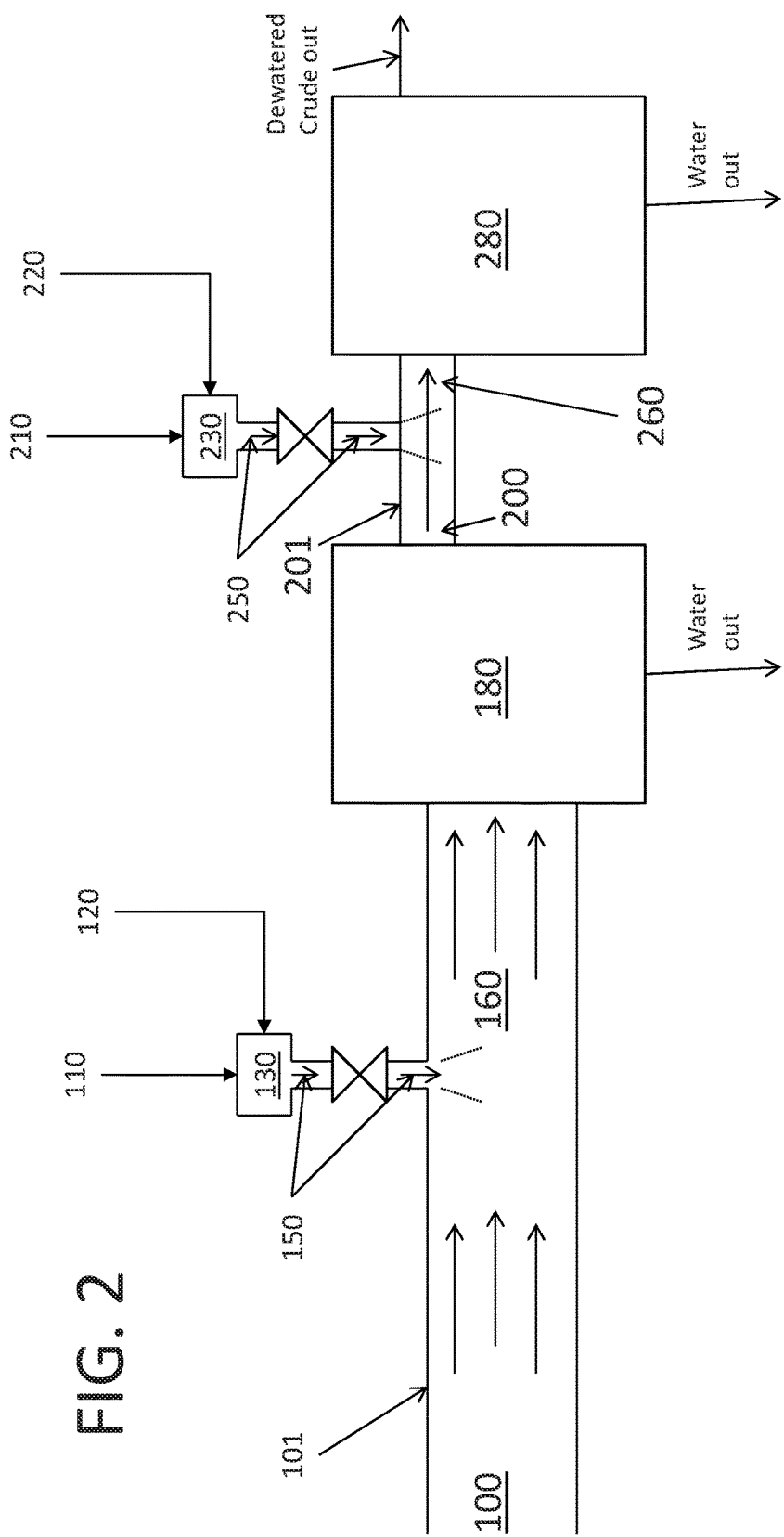
FIG. 2 is a schematic view of an alternate embodiment of a system for performing the methods provided herein.

FIG. 2 shows an alternate embodiment of a system for treating a stream comprising crude oil and water flowing in a conduit. As shown, stream 100 comprising crude oil and water flows in conduit 101. Multi-component performance liquid 110 is activated, e.g., by combining streams of multi-component performance liquid 110 and an aqueous liquid 120 into activator 130 to create activated multi-component performance liquid 150, which in certain embodiments of the methods is a loose oil-in-water emulsion, which is delivered to stream 100 to form treated stream 160. In certain embodiments, activated multi-component performance liquid 150 is delivered to stream 100 in a conical spread pattern. Treated stream 160 is allowed to separate into an oil-rich phase (i.e., oil phase) and an aqueous-rich phase (i.e., aqueous phase), e.g., via vessel 180, which may be a settling tank, a heater treater, an electrostatic treater, a sales tank, multiples thereof, and/or combinations thereof. Generally, a sales tank is the most downstream vessel of an oil field that contains crude oil to be sold to an oil refiner.

Furthermore, stream 200 comprising crude oil and water flows in conduit 201. Multi-component performance liquid 210, which may be the same or different from multi-component performance liquid 110, is activated, e.g., by combining streams of multi-component performance liquid 210 and an aqueous liquid 220 into activator 230 to create activated multi-component performance liquid 250, which in certain embodiments of the methods is a loose oil-in-water emulsion, which is delivered to stream 200 to form treated stream 260. In certain embodiments, activated multi-component performance liquid 250 is delivered to stream 200 in a conical spread pattern. Treated stream 260 is allowed to separate into an oil phase and an aqueous phase, e.g., via vessel 280, which may be a settling tank, a free water knock out, a heater treater, an electrostatic treater, a sales tank, multiples thereof, and/or combinations thereof.

The methods provided herein relate to treating a stream comprising crude oil and water flowing in a conduit. In certain embodiments, the stream further comprises gas (e.g., natural gas). In certain embodiments, the stream further comprises a diluent, which, for certain crudes, may be necessary to decrease viscosity of the crude oil. Utilization of a diluent is necessary for certain "heavy" crudes. Generally, the stream comprising crude oil and water flowing in a conduit is a production line of fluids (liquids and gases) produced by one or more oil wells and flowing through a pipeline.

The methods provided herein comprise activating a multi-component performance liquid. Activating is utilized herein to describe the step of combining a stream of aqueous liquid (e.g., water, which may include produced water, raw water, well water, fresh water, tap water, deionized water, distilled water, municipal water, wastewater, runoff water, gray water, municipal wastewater, treated water, partially treated water, brackish water, sea water, etc., and combinations thereof) with a stream of the multi-component performance liquid in a manner so as to form the multi-component performance liquid into an activated multi-component performance liquid. In order to form the activated multi-component performance liquid, the active ingredients of the multi-component performance liquid become dispersed throughout the aqueous liquid, and thus throughout the activated multi-component performance liquid. In certain embodiments, the aqueous liquid stream and the stream of the multi-component performance liquid are combined at a volumetric ratio of from about 6 parts to about 100 parts aqueous liquid per 1 part multi-component performance liquid. In certain embodiments of the methods provided herein, the aqueous liquid stream and the stream of the multi-component performance liquid are combined at a volumetric ratio of from about 50 parts to about 60 parts aqueous liquid per 1 part multi-component performance liquid.

Activating the multi-component performance liquid may be carried out via an activator, e.g., activator 130 of FIGS. 1 and 2. When utilized, the activator blends streams of the multi-component performance liquid and aqueous liquid to form the activated multi-component performance liquid. Examples of activators include, but are not limited to, devices described in U.S. Pat. Nos. 7,550,060; 7,785,442; 7,938,934; and 7,981,251, the disclosures of each of which are herein incorporated by reference (e.g., Nalco PARETO mixing technology, available from Nalco, an Ecolab Company, 1601 West Diehl Road, Naperville, Ill. 60563).

The activator for activating a mixture of components comprises: a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and optionally, an adaptor that is in communication with said outlets of said mixing chamber and is secured to said mixing chamber.

The activated multi-component performance liquid can be delivered to the stream comprising crude oil and water flowing in the conduit by any means known to those skilled in the art. For example, the combined stream of multi-component performance liquid and aqueous liquid (i.e., the stream of activated multi-component performance liquid) can be delivered via piping. In certain embodiments, the activated multi-component performance liquid is delivered to the stream comprising crude oil and water flowing in the conduit in a conical spread pattern. In certain embodiments, the activated multi-component performance liquid is delivered to the stream at a concentration of from about 10 to about 500 ppm volume multi-component performance liquid (pre-activation volume) based on the stream (e.g., the produced stream). In certain embodiments, the activated multi-component performance liquid is delivered to the stream at a pressure of from about 80 to about 160 psig.

In certain embodiments, the stream comprising crude oil and water is a crude oil production line. The crude oil production line may be a crude oil production line of an individual well, a crude oil production line of two or more wells that have been combined into a single production line, or a combination thereof. In certain embodiments, more than one activated multi-component performance liquid is delivered to the stream(s).

The treated stream is then allowed to separate into an oil phase and an aqueous phase, which can be done by allowing the treated stream to settle, for example, in a vessel. The vessel may be a settling tank, a free water knock out, a heater treater, an electrostatic treater, multiples thereof, and/or combinations thereof. When multiples and/or combinations of vessels are used, one or more activated multi-component performance liquids may be delivered to the stream(s) or treated stream(s) passing from one vessel to the next.

In certain embodiments, the treated stream comprises the active ingredients of the multi-component performance liquid at a concentration of from about 10 ppm to about 500 ppm by volume.

A multi-component performance liquid suitable for activation and use in treating a stream comprising crude oil and water flowing in a conduit is provided. The multi-component performance liquids described herein are suitable for use in the methods provided herein. Generally, the multi-component performance liquid comprises from about 55 weight percent to about 90 weight percent active ingredients having a weight average molecular weight of from about 1200 daltons to about 300,000 daltons.

Multi-component performance liquids are multi-component because they comprise active ingredients and solvent; thus, multi-component. Multi-component performance liquids differ from "standard treatment liquids," at least one example of which is described herein. Generally, multi-component performance liquids, like standard treatment liquids, comprise solvent. However, multi-component performance liquids comprise significantly less solvent than standard treatment liquids. For example, a standard treatment liquid generally comprises approximately 60 weight percent solvent or greater, which generally aids in lowering the viscosity of standard treatment liquids. Because multi-component performance liquids comprise about 55 weight percent or greater active ingredients, and thus no more than 45 weight percent solvent, multi-component performance liquids can be more viscous than standard treatment liquids. For example, in certain embodiments, the multi-component performance liquid has a viscosity of from about 100 centipoise to about 2500 centipoise when at a temperature of 24° C.

In certain embodiments, the multi-component performance liquid comprises from about 10 weight percent to about 45 weight percent solvent and from about 55 weight percent to about 90 weight percent active ingredients having a weight average molecular weight of from about 1200 daltons to about 300,000 daltons. In certain embodiments, the multi-component performance liquid comprises from about 60 weight percent to about 80 weight percent active ingredients. In certain embodiments, the active ingredients have a weight average molecular weight of from about 2000 daltons to about 200,000 daltons.

Generally solvent is capable of dissolving organic substances, particularly viscous organic substances, e.g., active ingredients. In certain embodiments of the multi-component performance liquid, the solvent is present in an amount that allows for the multi-component performance liquid to be transferred, e.g., via pump. In certain embodiments, the solvent is at least slightly soluble in water, for example, comprises diesel fuel, which may be no. 2 diesel fuel. In certain embodiments, the solvent comprises heavy aromatic distillates. In certain embodiments, the solvent comprises an alcohol, which in certain embodiments comprises at least one of methanol, ethanol, isopropanol, isobutanol, and ethyl hexanol. Generally, when present, the alcohol is present in a relatively small fraction (e.g., from about 2 to about 15 weight percent) along with aromatic-containing solvent (e.g., diesel fuel, heavy aromatic distillates, etc.) When present in the multi-component performance liquid, the heavy aromatic distillates and the diesel fuel (e.g., no. 2 diesel fuel) are present in the multi-component performance liquid at a weight ratio of from about 1 to about 1.5 parts heavy aromatic distillates per part diesel fuel. In certain embodiments, the multi-component performance liquid comprises aromatic-containing solvent and an alcohol. In certain embodiments, the aromatic-containing solvent and the alcohol are present in the multi-component performance liquid at a weight ratio of about 1 to about 5 parts aromatic-containing solvent to about 1 part alcohol.

In certain embodiments, the active ingredients are emulsion breakers. Generally, emulsion breakers are hydrophobic compositions that have high weight average molecular weights, e.g., greater than 1000 daltons, that aid in resolving or breaking water-in-oil emulsions, for example, those that generally form during crude oil production operations due to natural surfactants present in crude oil, and further due to increased mixing energy from flowing through conduits (e.g., pipelines), which in certain embodiments are equipped with valves. The presence of water can interfere with refining operations, induce corrosion, increase heat capacity, and result in reduced handling capacity of pipelines and refining equipment. Therefore, crude oil that is transported from an oil field should be substantially free of water (e.g., has a maximum basic sediment and water content ("BS&W") of less than about 3% by volume, or, e.g., from about 0% to about 3% BS&W by volume). Emulsion breakers, i.e., demulsifiers, are added to assist and promote efficient water and oil separation.

In certain embodiments, the active ingredient comprises a formaldehyde-containing resin. In certain embodiments, the active ingredients comprise at least one of an oxyalkylated alkylphenol formaldehyde resin, a polyol, a block copolymer of polypropylene glycol, an oxyalkylated amine, an oxyalkylated polyol, an oxyalkylated polyethylene imine, polyurethane, combinations thereof, and crosslinked variants thereof. In certain embodiments, the active ingredients comprise at least two of an oxyalkylated alkylphenol formaldehyde resin, a polyol, a block copolymer of polypropylene glycol, an oxyalkylated amine, an oxyalkylated polyol, an oxyalkylated polyethylene imine, polyurethane, combinations thereof, and crosslinked variants thereof. In further embodiments, the active ingredients comprise at least three of an oxyalkylated alkylphenol formaldehyde resin, a polyol, a block copolymer of polypropylene glycol, an oxyalkylated amine, an oxyalkylated polyol, an oxyalkylated polyethylene imine, polyurethane, combinations thereof, and crosslinked variants thereof. All of the aforementioned active ingredients are examples of emulsion breakers.

In certain more specific embodiments, one of the at least two active ingredients is one of nonylphenol formaldehyde resin, an alkoxylated nonyl-butyl phenol formaldehyde resin, and t-amylphenol formaldehyde resin. In certain embodiments, one of the at least two active ingredients is a reaction product of an oxalkylate and a di-epoxide. In certain embodiments, one of the at least two active ingredients is a modified acrylic polymer, which in certain embodiments is modified with at least one of t-butylphenol, formaldehyde, maleic anhydride, ethylene oxide, propylene oxide, and 4-nonylphenol.

The following examples further illustrate the invention but, of course, should not be construed as in any way limiting its scope.

EXAMPLES

A stream comprising crude oil and water flowing in an oil field production pipeline was treated via a standard method of treatment and via the methods disclosed herein.

Example 1

The standard treatment liquid having certain active ingredients was delivered to the production streams, e.g., a stream comprising crude oil and water, at each well pad (e.g., before the general treater) of three crude oil production lines, as well as at a manifold outlet that merged the three crude oil production lines together into a single crude oil production line. The standard treatment liquid comprised the following formula:
  60 weight percent solvent split accordingly:
    26 weight percent Diesel Fuel No. 2
    34 weight percent heavy aromatic distillates
  40 weight percent active ingredients split accordingly:
    6 weight percent the reaction product of ethylene oxide and propylene oxide with diglycidyl ether of bisphenol A ("EPON")
    4 weight percent acrylic acid polymer reacted with t-butylphenol, formaldehyde, maleic anhydride, ethylene oxide, propylene oxide and 4-nonylphenol
    30 weight percent 4-nonylphenol formaldehyde resin.
The standard treatment liquid was delivered to each well pad stream at a concentration of 233 ppm, and to the manifold outlet at 207 ppm by volume of treated stream (i.e., 93 ppm and 83 ppm active ingredients by volume of treated stream).

The treated stream was degassed and fed into a settling tank. Crude oil leaving the settling tank contained from about 2 percent to about 4 percent of basic sediments and water by volume. The crude oil leaving the settling tank was passed to secondary treatment vessels. Oil leaving the secondary treatment vessels contained about 0.2-0.4 percent by volume basic sediments and water. Water separated from the secondary treatment vessels had a mean oil concentration of 31 ppm oil, a mean measured turbidity of 53 FAU, and a mean total suspended solids below 10 mg/L.

Example 2

A multi-component performance liquid having the same certain active ingredients at the same ratios as the standard treatment liquid was activated and delivered to the stream comprising crude oil and water via the methods disclosed herein. The multi-component performance liquid of this example had the following formulation:
  40 weight percent solvent split accordingly:
    18 weight percent Diesel Fuel No. 2
    22 weight percent heavy aromatic distillates
  60 weight percent active ingredients split accordingly:
    9 weight percent the reaction product of ethylene oxide and propylene oxide with EPON
    6 weight percent acrylic acid polymer reacted with t-butylphenol, formaldehyde, maleic anhydride, ethylene oxide, propylene oxide and 4-nonylphenol
    45 weight percent 4-nonylphenol formaldehyde resin.

The multi-component performance liquid was activated with water via an activator (e.g., PARETO mixing technology) to create an activated multi-component performance liquid having 47 ppm by volume active ingredients. The activated multi-component performance liquid was delivered to the stream at the manifold outlet upstream of the settling tank at a concentration of 78 ppm by volume treated stream (i.e., 47 ppm active ingredients by volume treated stream). The standard treatment liquid was delivered to the well pads as described in Example 1, except for its delivery was decreased to 78 ppm instead of 233 ppm. Oil leaving the settling tank contained from about 1 percent basic sediments and water by volume prior to entering the secondary treatment vessels. Oil leaving the secondary treatment vessels contained about 0.2 percent basic sediments and water by volume. Water separated from the overall process had a mean oil concentration of 16 ppm, a mean measured turbidity of 21 FAU, and a mean total suspended solids below 10 mg/L. Thus, the overall treatment of active ingredients was reduced to approximately 65% at the well pads and 63% prior to the first settling tank, while improving performance of the crude oil dehydration process.

Example 3

A standard treatment liquid as described below was delivered to the production stream, e.g., a stream comprising crude oil and water, at the well pad (e.g., before the general treater), where production streams from each well merged into a single crude oil production line, and after leaving the second vessel (the heater treater) towards the sales tanks. The standard treatment liquid of this example comprised the following formula:
  50 weight percent heavy aromatic distillates
  50 weight percent active ingredients split accordingly (5:2:2:1):
    25 weight percent ethoxylated 4-tert-amylphenol formaldehyde resin
    10 weight percent the reaction product of polypropylene glycol and EPON
    10 weight percent acrylic acid polymer reacted with t-butylphenol, formaldehyde, maleic anhydride, ethylene oxide, propylene oxide and 4-nonylphenol
    5 weight percent alkoxylated nonyl-butyl phenol formaldehyde resin with mixed oxides (e.g., propylene oxide and ethylene oxide).

The standard treatment liquid was delivered at the well pad stream, upstream of the general treater, at a concentration of 37 ppm, then it was fed into the heater treater. The crude oil leaving the heater treater was treated at a concentration of 23 ppm by volume of treated stream (i.e., 18.5 ppm and 11.5 ppm active ingredients by volume of treated stream). The crude oil leaving the heater treater had a temperature of about 130° F. and contained about 12 percent by volume basic sediments and water. The crude oil leaving the heater treater was delivered to sales tanks, which had crude oil ("sales" oil) having about 0.3 percent by volume basic sediments and water and about 16 pounds per thousand barrels ("ptb") of total dissolved solids, after a residence time of 9 hours.

Example 4

A multi-component performance liquid comprising active ingredients at the same ratio of active ingredients of the multi-component performance liquid of Example 3 (i.e., 5:2:2:1), but comprising 80 weight percent active ingredients and 20 weight percent solvent was utilized in treating the stream of crude oil and water according to the method of Example 3, but with only one delivery point, at the well pad (upstream of the general treater). The multi-component performance liquid of this example had the following formula:
  20 weight percent solvent split accordingly:
    7 weight percent isobutanol
    13 weight percent heavy aromatic distillates
  80 weight percent active ingredients split accordingly (5:2:2:1):
    40 weight percent ethoxylated 4-tert-amylphenol formaldehyde resin
    16 weight percent the reaction product of polypropylene glycol and EPON
    16 weight percent acrylic acid polymer reacted with t-butylphenol, formaldehyde, maleic anhydride, ethylene oxide, propylene oxide and 4-nonylphenol
    8 weight percent alkoxylated nonyl-butyl phenol formaldehyde resin with mixed oxides (e.g., propylene oxide and ethylene oxide).

The multi-component performance liquid of this example was activated with water using an activator (e.g., PARETO mixing technology) to create an activated multi-component performance liquid having 15 ppm by volume active ingredients. The activated multi-component performance liquid was delivered to the stream comprising crude oil and water at the well pad at a concentration of 19 ppm by volume treated stream (i.e., 15 ppm active ingredients by volume treated stream). The crude oil leaving the heater treater had a temperature of about 130° F. and contained about 4 percent by volume basic sediments and water. The crude oil leaving the heater treater was delivered to sales tanks, which had crude oil ("sales" oil) having about 0.4 percent by volume basic sediments and water and about 16 ptb total dissolved solids. The surprising results of Example 4 were achieved without the need of injecting the standard treatment liquid prior to the heater treater. Thus, the overall treatment of active ingredients was reduced by approximately 69% while improving performance of the crude oil dehydration process and reducing "sales" tank residence time by about 33%.

Example 5

The standard treatment liquid of Example 3 was tested using the method of Example 4 in an attempt to replicate the surprising and beneficial results achieved in Example 4, but while using the standard treatment liquid of Example 3 at the same concentration of active ingredients. The use of standard treatment liquid activated with water in an activator as in Example 4 deteriorated the crude oil dehydration process by increasing basic sediments and water percent to unacceptable levels. Utilization of the standard treatment liquid as described in Example 3 was unable to achieve oil-water separation levels achieved in Examples 2 and 4.

Example 6

This example merely provides another formulation that is expected to provide similar beneficial results to those demonstrated in Examples 2 and 4 herein.
36 weight percent solvent split accordingly:
  6 weight percent isobutanol
  30 weight percent heavy aromatic distillates
  64 weight percent active ingredients split accordingly:
    53.3 weight percent reaction product of propylene glycol and EPON
    3.2 weight percent alkoxylated 4-nonylphenol-HCHO resin reacted with mixed oxides (e.g., propylene oxide and ethylene oxide)
    3.2 weight percent alkoxylated 4-nonylphenol-HCHO resin with sequential addition of propylene oxide and ethylene oxide.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of treating a stream comprising crude oil and water flowing in a stream conduit comprising:
    activating a multi-component performance liquid comprising from about 55 weight percent to about 90 weight percent active ingredients having a weight average molecular weight of from about 1200 daltons to about 300,000 daltons to form an activated multi-component performance liquid;
    wherein the activating comprises inputting energy into a stream of the multi-component performance liquid in combination with an aqueous liquid stream by an activator to obtain an oil-in-water emulsion that, once said inputting of energy ceases, does not separate into an oil phase and an aqueous phase up to about 2 to about 5 minutes;
    wherein the activator comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said outlets of said mixing chamber, and is secured to said mixing chamber;
    delivering the activated multi-component performance liquid to the stream comprising crude oil and water to form a treated stream; and
    allowing the treated stream to separate into an oil phase and an aqueous phase.

2. The method of claim 1, wherein the activated multi-component performance liquid comprises from about one to about six parts by volume of multi-component performance liquid per about 100 parts volume water.

3. The method of claim 1, further comprising maintaining the stream comprising crude oil and water at a temperature of from about 25° C. to about 130° C.

4. The method of claim 1, wherein the stream conduit is an oil field production pipeline.

5. The method of claim 4, wherein the oil field production pipeline is a pipeline transporting crude oil and water from a first vessel to a second vessel.

6. The method of claim 5, wherein the first vessel is a settling tank and the second vessel is a heater treater.

7. The method of claim 1, wherein the multi-component performance liquid comprises from about 60 weight percent to about 80 weight percent active ingredients.

8. The method of claim 1, wherein the active ingredients comprise at least one of an oxyalkylated alkylphenol formaldehyde resin, a polyol, a block copolymer of polypropylene glycol, an oxyalkylated amine, an oxyalkylated polyol, an oxyalkylated polyethylene imine, a polyurethane, combinations thereof, and crosslinked variants thereof.

9. The method of claim 1, wherein the active ingredients comprise at least one of nonylphenol formaldehyde resin, an alkoxylated nonyl-butyl phenol formaldehyde resin, and t-amylphenol formaldehyde resin.

10. The method of claim 1, wherein the active ingredients comprise a modified acrylic polymer.

11. The method of claim 10, wherein the modified acrylic polymer is modified with at least one of t-butylphenol, formaldehyde, maleic anhydride, ethylene oxide, propylene oxide, and 4-nonylphenol.

12. The method of claim 1, wherein the active ingredients comprise a reaction product of ethylene oxide and propylene oxide with diglycidyl ether of bisphenol A.

13. The method of claim 1, wherein the active ingredients comprise acrylic acid polymer reacted with t-butylphenol, formaldehyde, maleic anhydride, ethylene oxide, propylene oxide, and 4-nonylphenol.

14. The method of claim 1, wherein the active ingredients comprise 4-nonylphenol formaldehyde resin.

15. The method of claim 1, wherein the active ingredients comprise ethoxylated 4-tert-amylphenol formaldehyde resin.

16. The method of claim 1, wherein the active ingredients comprise alkoxylated nonyl-butyl phenol formaldehyde resin with mixed oxides.

17. The method of claim 1, wherein the active ingredients comprise a reaction product of polypropylene glycol with diglycidyl ether of bisphenol A.

18. The method of claim 1, wherein the active ingredients comprise alkoxylated 4-nonylphenol-HCHO resin reacted with mixed oxides.

19. The method of claim 1, wherein said oil-in-water emulsion does not separate into an oil phase and an aqueous phase up to about 3 to about 5 minutes after the inputting of energy ceases.

\* \* \* \* \*